UNITED STATES PATENT OFFICE.

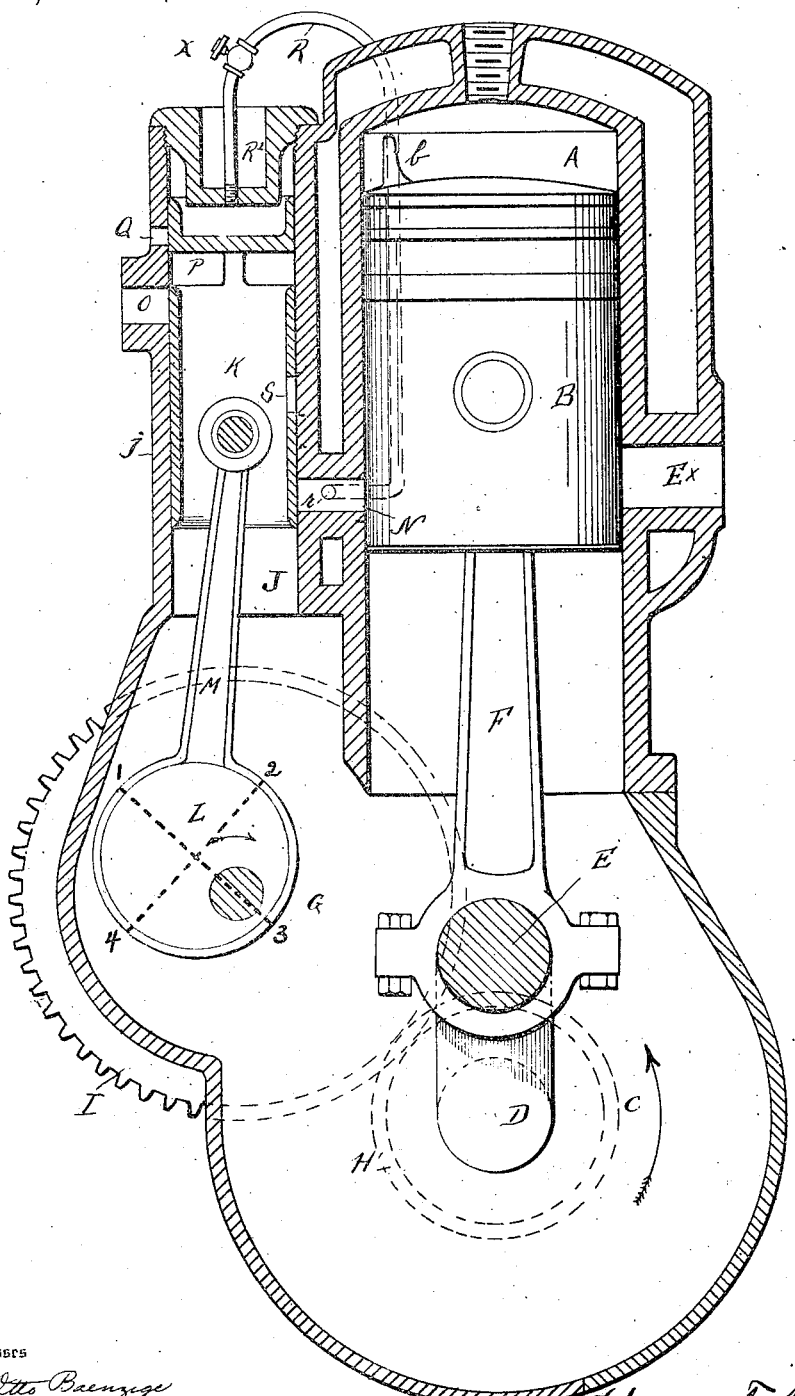

HORACE T. THOMAS, OF LANSING, MICHIGAN.

INTERNAL-COMBUSTION ENGINE.

1,174,774.   Specification of Letters Patent.   Patented Mar. 7, 1916.

Application filed November 6, 1911.   Serial No. 658,679.

*To all whom it may concern:*

Be it known that I, HORACE T. THOMAS, citizen of the United States, residing at Lansing, county of Ingham, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

My invention relates to internal combustion engines, and an object of my improvements is to provide an improved control for the gases which enter and are discharged from the combustion chamber. I attain this object in the device illustrated in the accompanying drawing, in which the figure is a vertical section of an engine embodying my invention.

A, is the cylinder of a vertical engine, the combustion chamber being in the upper end thereof.

B, is a piston adapted to reciprocate in the cylinder A.

C, is the crank chamber, which also serves as a compression chamber for the charge before it enters the combustion chamber.

D, is the main shaft of the engine, and E, is the crank which is connected with the piston B by the usual connecting rod F.

G, is a counter shaft geared to the main shaft D so as to have half the angular velocity of the latter.

I, is a gear wheel on the shaft G, and H is a gear wheel on the shaft D, by which gear wheels said shafts are connected to have the required relative angular velocity.

J, is a cylinder parallel with the cylinder A, which may be cast integral therewith. Said cylinder is closed at its upper end and at its lower end opens to the interior of the crank case C.

K, is a piston valve adapted to reciprocate in the cylinder J.

L, is an eccentric upon the shaft G, and M is an eccentric rod pivoted at its upper end to the piston valve K having an eccentric strap at its lower end passing around the eccentric L.

E$x$ is the exhaust port of the usual construction in two-cycle engines and adapted to be uncovered by the piston B at the lower end of its stroke.

N, is an intake port extending through the walls of the cylinders J A and connecting the bores of said cylinders. The port N is so located that it shall be uncovered by the piston B at the lower end of its stroke after the port E$x$ has been opened.

$b$ is a deflecting plate on the piston B by which the incoming charge from the crank chamber C is deflected to the upper end of the cylinder in the usual way.

O, is a port through the wall of the cylinder J, this port will be connected with the carbureter so that the explosive mixture will be drawn in through the port O.

Q, is a port through the wall of the cylinder J above the port O adapted to be uncovered and covered by the upper end of the piston K. The piston K is a hollow cylinder closed at its upper end and open to the cylinder J and crank case C at its lower end.

P, is a port through the wall of the piston K toward the upper end thereof.

S, is a port through the wall of said piston intermediate of its length. The port P is adapted to register with the port O and thereby to connect the crank case C through the piston K and cylinder J with the intake port O. The port S is adapted to register with the port N at the lower end of the stroke of the piston K to form a connection between the crank case C and the cylinder A above the piston B.

R, is a pipe opening into the otherwise closed upper end of the cylinder J at R$^1$, and into the port N at $r$.

The figure is drawn approximately to scale.

The operation of the above described engine is as follows:—The eccentric L and crank E have the relative position shown, the piston B being at the upper end of its stroke with the charge compressed above it. The charge is ignited forcing the piston B downward. When the port E$x$ is opened the burnt gases are largely discharged therethrough by their own pressure. The piston B, descending farther, uncovers the port N. This corresponds to a movement of the crank E of 180 degrees, from its upper dead center to is lower dead center. During this stroke the eccentric L has turned through an angle of 90 degrees from the position marked 1 to that marked 2. During this movement the piston K has moved upward compressing air above it in the upper end of the cylinder J and forcing said air through the pipe R into the port N and from thence into the cylinder A above the piston B, helping to force out the residual burnt gases. The lower edge of the piston valve K uncovers the port N more or less, according to the service for which the engine is designed, allowing a small quantity of explosive mixture to pass from the crank chamber C into the cylinder A above the piston B forcing out residual gases therefrom. The crank E continuing to turn, the piston B rises covering the ports N and Ex and reducing the pressure in the crank case C. The piston valve K descends during the upward stroke of the piston B (the eccentric L moving from the position 2 to that marked 3); in the first place causing the ports O and P to register, and admitting an explosive mixture through the ports O, P and the hollow piston K and cylinder J, into the crank case C to supply the partial vacuum drawn by the piston B. The piston valve continuing to descend the port P passes by the port O and the latter is closed by the piston valve K. No explosion takes place on this stroke of the piston B. The piston B now descends to its lower dead center again uncovering the ports Ex and N. The piston valve K continues to descend during most of this stroke (while the eccentric is moving from 3 to 4) causing the port S to register with the port N and establishing communication between the crank case C and the cylinder A above the piston B, thus admitting an explosive mixture to the cylinder A above the piston B. During the latter part of the down stroke of the piston B the piston valve K has reached its lower dead center and has again risen a short distance. The piston B now rises closing the ports N and Ex compressing the charge above it and again rising to the position shown in the drawing. An explosion now takes place in the cylinder A above the piston B and the above described cycle is repeated.

The quantity of explosive mixture admitted from the crank case just following the explosion or working stroke depends upon the position of the lower edge of the piston valve K relative to the port N and this is designed and adjusted to secure the desired action.

It will be seen that by means of the piston valve K having the arrangement and movement relative to the piston B above described, a greater amount of explosive mixture may be taken into the crank case and a higher compression secured therein, than is obtained by the use of the working piston alone. In some cases the piston valve K will be so proportioned that it will not uncover the port N on its upward stroke. It will be noticed that the piston valve K is near the upper end of its stroke at the end of the working stroke of the piston B, and at the lower end of its stroke when the charge is admitted to the combustion chamber, therefore the pressure in the compression chamber is less in the former case and greater in the latter than would be the case if the compression was due solely to the movement of the piston B. By proportioning the piston valve K the amount of the residual gases that are expelled at each cycle following the explosion stroke, may be controlled. If said valve is so proportioned that it does not uncover the port N on its up stroke then the gases remaining in the combustion chamber, when the port Ex is opened, are only expelled by the air through the pipe or passage R; if said valve is so proportioned as to uncover said port, the residual gases are expelled by the air through the passage R and also by the mixture flowing from the compression chamber under small compression through the port N; if the passage R is closed as by a cock x only the gases from the compression chamber will act to clear out the cylinder.

While the above gives in general the operation of my invention, I do not wish to limit myself to the construction as shown, since another type of valve oscillating or rotary, may be used in place of the piston valve by sacrificing the benefits obtained from use of the piston valve to aid in securing increased crankcase compression and to furnish an independent supply of fresh air for scavenging.

It will be noticed that the action above described is that of the four-cycle engine and that by the use of the above described engine the disadvantages of noisy valves, or valves directly exposed to the high temperature of the burning gases are avoided. That a simple arrangement of the parts is provided whereby the working cylinder is cleaned of the burnt gases contained therein at the time of the exhaust by displacing these gases with a fresh charge of fuel or air. That a motor is secured having a wide range of adaptability with regard to economy of power; maximum power being obtained by giving two fuel charges for each explosive stroke, and economy secured by using air instead of fuel to scavenge the cylinder.

What I claim is:—

1. In an internal combustion engine, the combination of a cylinder, a piston adapted to reciprocate therein, said cylinder having an exhaust port and an intake port, means for opening said ports toward one end of the travel of said piston, a compression chamber, said piston adapted to compress an explosive mixture in said chamber toward said end of the travel of said piston, said intake port communicating with said compression chamber, and a valve adapted to cover said intake port and to uncover the same to different extents at alternate movements of said piston to said end of its travel.

2. In an internal combustion engine, a cylinder, a piston adapted to reciprocate therein, a compression chamber, said piston adaped to compress an explosive mixture in said chamber toward one end of the travel said piston, an exhaust and an intake port in said cylinders, means for opening said ports toward said end of the travel of said piston, said intake port communicating with said compression chamber, a reciprocating valve adapted to cover said intake port and to uncover the same at each end of its stroke, and toward said end of the piston stroke, and connection between said piston and said valve whereby the latter has twice the period of reciprocation of the former, substantially as and for the purpose described.

3. In an internal combustion engine, a cylinder, a piston adapted to reciprocate therein, a compression chamber, said piston adapted to compress an explosive mixture in said chamber toward one end of the travel of said piston, an exhaust and an intake port in said cylinder, means for opening said ports toward said end of the travel of the piston, said intake port communicating with said compression chamber, a reciprocating valve adapted to cover said intake port and to uncover the same at each end of its stroke and at said end of the piston stroke, a connection between said piston and said valve whereby the latter shall have twice the period of reciprocation of the former, a cylinder inclosing said valve, connection between the last named cylinder and said intake port, said valve and inclosing cylinder being arranged to act as an air pump to force air through said connection into the first named cylinder at one end of the travel of said valve.

4. In an internal combustion engine, a cylinder, a piston adapted to reciprocate therein, a compression chamber arranged to have an explosive mixture compressed therein by said piston, an exhaust and an intake port through the wall of said cylinder adapted to be uncovered by said piston at one end of its stroke, said intake port communicating with said compression chamber, a reciprocating valve adapted to cover said intake port and to uncover the same for the purpose of admitting a charge at each alternate return of said piston to said end of its stroke, a connection between said piston and said valve whereby the latter shall have twice the period of reciprocation of the former, a cylinder inclosing said valve and opening to said compression chamber at that end toward which said valve is situated when it uncovers said port, said valve and inclosing cylinder being adapted to act as an air pump to force air into said first mentioned cylinder at the opposite end of the stroke of said valve.

5. In an internal combustion engine, a cylinder, a piston adapted to reciprocate therein, a compression chamber adapted to have an explosive mixture compressed therein by said piston, an exhaust and an intake port through the wall of said cylinder adapted to be uncovered by said piston at one end of its stroke, said intake port communicating with said compression chamber, a reciprocating valve adapted to cover said intake port and to uncover the same at each end of its stroke and at said end of the piston stroke, a cylinder inclosing said valve and communicating with said compression chamber and a connection between said piston and said valve whereby the latter shall have twice the period of reciprocation of the former.

6. The combination of the cylinder A, a piston adapted to reciprocate therein, the compression chamber C, said cylinder opening into said compression chamber, the exhaust port Ex, an inlet port N, said inlet port being adapted to be uncovered by said piston at the end of its working stroke, a valve K, a crank shaft D, said piston being connected to said crank shaft, a shaft G, an eccentric on the shaft G connected with said valve and a gearing connecting the shafts D and G so that the latter shall have half the angular velocity of the former, said valve being adapted to cover said inlet port and to uncover the same at each end of its stroke when said port is uncovered by the piston B.

7. In an internal combustion engine, the combination of a cylinder, a compression chamber, a piston adapted to reciprocate in said cylinder, means whereby the reciprocation of said piston shall compress an explosive mixture in said compression chamber, an exhaust port and an intake port adapted to be uncovered by said piston at one end of its travel, a cylinder J communicating with said compression chamber, said intake port communicating with the cylinder J, a hollow valve K adapted to reciprocate in the cylinder J and to cover said intake port and to uncover the same at each end of its travel, a port O opening through the wall of the cylinder J, a port P opening through the wall of the hollow valve K and adapted to register with the port O and means for reciprocating said valve with twice the period of reciprocation of said piston, the parts being arranged, substantially as and for the purpose described.

8. In an internal combustion engine, the combination of a cylinder, a compression chamber, a piston adapted to reciprocate in said cylinder, means whereby the reciprocation of said piston shall compress an explosive mixture in said compression chamber, an exhaust port and an intake port adapted to be uncovered by said piston at one end of its travel, a cylinder J communicating with said compression chamber, said intake port communicating with the cylinder J, a cylindrical valve K adapted to reciprocate in the cylinder J and to cover said intake port and to uncover the same at each end of its travel, a port O opening through the wall of the cylinder J, a port P opening through the wall of the valve K and adapted to register with the port O and means for reciprocating said valve with twice the period of reciprocation of said piston, a passage R connecting the closed end of the cylinder J with said intake port, and means for admitting atmospheric air into the closed end of the cylinder J above said valve, the parts being arranged, substantially as and for the purpose described.

9. In an internal combustion engine, the combination of a cylinder, a compression chamber, a piston adapted to reciprocate in said cylinder, means whereby the reciprocation of said piston shall compress an explosive mixture in said compression chamber, an exhaust port and intake port adapted to be uncovered by said piston at one end of its travel, a cylinder J communicating with said compression chamber, said intake port communicating with the cylinder J, a hollow valve K adapted to reciprocate in the cylinder J and to cover said intake port and to uncover the same at each end of its travel, a port O opening through the wall of the cylinder J, a port P opening through the wall of the valve K and adapted to register with the port O, and means for reciprocating said valve with twice the period of reciprocation of said piston, a passage R connecting the closed end of the cylinder J with the intake port, a port Q through the wall of the cylinder J, adapted to be uncovered by said valve on its downward stroke, the ports being arranged, substantially as and for the purpose described.

10. In an internal combustion engine, a cylinder, a piston adapted to reciprocate therein, a compression chamber arranged to have an explosive mixture compressed therein by said piston, an exhaust and an intake port through the wall of said cylinder adapted to be uncovered by said piston at one end of its stroke, said intake port communicating with said compression chamber, a reciprocating valve adapted to cover said intake port and to uncover the same at each alternate return of said piston to said end of its stroke, a connection between said piston and said valve whereby the latter shall have twice the period of reciprocation of the former, a cylinder inclosing said valve and opening to said compression chamber at that end toward which said valve is situated when it uncovers said port.

In testimony whereof, I sign this specification in the presence of two witnesses.

HORACE T. THOMAS.

Witnesses:
  CHAS. P. THOMAS,
  PHILIP J. BAKER, Jr.